(12) United States Patent
Priisholm et al.

(10) Patent No.: US 10,866,581 B2
(45) Date of Patent: Dec. 15, 2020

(54) VALVE CONTROLLER AND METHOD FOR MONITORING FLOW CONTROL VALVE

(71) Applicant: ALFA LAVAL CORPORATE AB, Lund (SE)

(72) Inventors: Thomas Priisholm, Kolding (DK); Karsten Schack Madsen, Odense C (DK); Axel Lund Henriksen, Odense C (DK)

(73) Assignee: ALFA LAVAL CORPORATE AB, Lund (SE)

( * ) Notice: Subject to any disclaimer, the term of this patent is extended or adjusted under 35 U.S.C. 154(b) by 72 days.

(21) Appl. No.: 15/758,252

(22) PCT Filed: Sep. 9, 2016

(86) PCT No.: PCT/EP2016/071349
§ 371 (c)(1),
(2) Date: Mar. 7, 2018

(87) PCT Pub. No.: WO2017/042361
PCT Pub. Date: Mar. 16, 2017

(65) Prior Publication Data
US 2018/0259950 A1    Sep. 13, 2018

(30) Foreign Application Priority Data
Sep. 11, 2015  (EP) .................................. 15184920

(51) Int. Cl.
*G05B 23/02* (2006.01)
*F16K 37/00* (2006.01)
(Continued)

(52) U.S. Cl.
CPC ............ *G05B 23/0224* (2013.01); *F16K 1/46* (2013.01); *F16K 31/1221* (2013.01);
(Continued)

(58) Field of Classification Search
None
See application file for complete search history.

(56) References Cited

U.S. PATENT DOCUMENTS 5,109,675 A * 5/1992 Hwang ..................... G05B 9/02
251/129.04
6,307,376 B1   10/2001 Alexander et al.
(Continued)

FOREIGN PATENT DOCUMENTS

CA   2 742 578 A1   12/2012
CN     1261589 A    8/2000
(Continued)

OTHER PUBLICATIONS

International Search Report (PCT/ISA/210) dated Nov. 22, 2016, by the European Patent Office as the International Searching Authority for International Application No. PCT/EP2016/071349.
(Continued)

*Primary Examiner* — Bernard G Lindsay
(74) *Attorney, Agent, or Firm* — Buchanan Ingersoll & Rooney PC

(57) ABSTRACT

A valve controller for controlling a valve and a valve comprising the valve controller are disclosed. The valve comprises an actuator and a flow controlling unit. The valve controller comprises equipment for controlling the function of at least one of the actuator and the flow controlling unit. The valve controller is further configured to obtain one or more first parameter values indicative of a functionality of the equipment at startup of the valve controller. The valve controller is configured to monitor the equipment during operation of the valve controller for determining one or more second parameter values indicative of the functionality of the equipment and determining if a change in functionality of the equipment has occurred based on a comparison
(Continued)

of the one or more second parameter values with the one or more first parameter values.

14 Claims, 6 Drawing Sheets

(51) Int. Cl.
*F16K 31/122* (2006.01)
*F16K 1/46* (2006.01)
*G05B 19/416* (2006.01)

(52) U.S. Cl.
CPC ...... *F16K 37/0033* (2013.01); *F16K 37/0041* (2013.01); *G05B 19/416* (2013.01); *G05B 2219/45006* (2013.01)

(56) References Cited

U.S. PATENT DOCUMENTS

| | | | |
|---|---|---|---|
| 7,886,766 B2 | 2/2011 | Radomsky et al. | |
| 8,036,837 B2 | 10/2011 | Wilke | |
| 8,271,141 B2 | 9/2012 | Cummings et al. | |
| 2002/0129799 A1* | 9/2002 | Wang | F02M 26/48 123/568.16 |
| 2007/0187634 A1* | 8/2007 | Sneh | F16K 7/14 251/30.01 |
| 2008/0004836 A1 | 1/2008 | Tewes et al. | |
| 2009/0306830 A1 | 12/2009 | Cummings et al. | |
| 2010/0236632 A1* | 9/2010 | Jakobsen | F15B 21/06 137/1 |
| 2011/0138799 A1 | 6/2011 | Wagner | |
| 2011/0260085 A1 | 10/2011 | van der Zee et al. | |
| 2014/0096850 A1 | 4/2014 | Filkovski et al. | |
| 2014/0116542 A1 | 5/2014 | Feinauer et al. | |
| 2014/0261740 A1 | 9/2014 | Bush | |
| 2014/0305525 A1 | 10/2014 | Le Moing et al. | |
| 2015/0040997 A1 | 2/2015 | Blake et al. | |
| 2015/0045970 A1 | 2/2015 | Anderson | |
| 2016/0069473 A1* | 3/2016 | Kucera | F16K 37/0041 137/637 |
| 2018/0245712 A1 | 8/2018 | Priisholm et al. | |

FOREIGN PATENT DOCUMENTS

| | | |
|---|---|---|
| CN | 1894526 A | 1/2007 |
| CN | 101484856 A | 7/2009 |
| CN | 101878389 A | 11/2010 |
| CN | 102753837 A | 10/2012 |
| CN | 104345727 A | 2/2015 |
| CN | 104653839 A | 5/2015 |
| EP | 1 022 494 A2 | 7/2000 |
| EP | 3060813 B1 | 10/2019 |
| JP | 07-325625 A | 12/1995 |
| JP | 2005337371 A | 12/2005 |
| WO | 2015061382 A1 | 4/2015 |

OTHER PUBLICATIONS

Written Opinion (PCT/ISA/237) dated Nov. 22, 2016, by the European Patent Office as the International Searching Authority for International Application No. PCT/EP2016/071349.

U.S. Appl. No. 15/758,198, filed Mar. 7, 2018, Thomas Priisholm et al.

An English Translation of the First Office Action dated Apr. 1, 2020, by the National Intellectual Property Administration, P. R. China in corresponding Chinese Patent Application No. 201680052433.9. (15 pages).

* cited by examiner

100 – Obtaining first parameter values indicative of functionality of equipment.

102 – Determining first parameter values indicative of functionality of equipment.

104 – Storing first parameter values in memory unit.

200 – Monitoring equipment for determining second parameter values indicative of the functionality.

202 – Retrieving first parameter values from memory unit.

Fig.5

200 – Monitoring equipment for determining second parameter values indicative of the functionality.

210 – Determined that change in functionality has occured.

Change in functionality? — Yes — 212 – Indicating change in functionality to operator/process control system.

Fig.6

```
┌─────────────────────────────────────────────────────────┐
│ 100 – Obtaining first parameter values indicative of    │
│ functionality of equipment.                             │
└─────────────────────────────────────────────────────────┘
                            │
┌─────────────────────────────────────────────────────────┐
│ 106 – Measuring first voltage at first electrical input │
│ with pilot valve deactivated.                           │
└─────────────────────────────────────────────────────────┘
                            │
┌─────────────────────────────────────────────────────────┐
│ 108 – Measuring third voltage at second electrical input│
│ with sensor turned off.                                 │
└─────────────────────────────────────────────────────────┘
                            │
┌─────────────────────────────────────────────────────────┐
│ 200 – Monitoring equipment for determining second       │
│ parameter values indicative of the functionality.       │
└─────────────────────────────────────────────────────────┘
                            │
┌─────────────────────────────────────────────────────────┐
│ 214 – Measuring second voltage at first electrical input│
│ subsequent to a deactivation of pilot valve.            │
└─────────────────────────────────────────────────────────┘
                            │
┌─────────────────────────────────────────────────────────┐
│ 216 – Turning off sensor.                               │
└─────────────────────────────────────────────────────────┘
                            │
┌─────────────────────────────────────────────────────────┐
│ 218 – Measuring fourth voltage at second electrical     │
│ input of sensor.                                        │
└─────────────────────────────────────────────────────────┘
                            │
┌─────────────────────────────────────────────────────────┐
│ 220 – Turning on sensor.                                │
└─────────────────────────────────────────────────────────┘
```

Fig.7

VALVE CONTROLLER AND METHOD FOR MONITORING FLOW CONTROL VALVE

TECHNICAL FIELD

The present invention relates generally to fluid valves. Further, the present invention relates specifically to the field of devices for monitoring fluid valves.

BACKGROUND ART

There are many different types of fluid valves deployed in various industrial applications. Such fluid valves include seat valves of both single-seat type and double-seat type, as well as membrane valves, butterfly valves etc. There are also numerous variants within each specific type of valve. The fluid valves may be designed as on-off valves, changeover valves, mixing valves, pressure regulating valves, control valves, sampling valves, etc.

In industrial applications, fluid valves are arranged to influence and control a process in a targeted manner, e.g. in a process plant. The process plant may thus involve a large number of fluid valves, and each fluid valve may need to be precisely controlled to perform a specific task at a specific time.

In order to control the process, it is common to connect the valves to a control network in which a main controller operates to control the operation of the valves. To reduce the demand on the main controller, it is known to provide each fluid valve with a valve controller that is connected to the valve so as to control its operation based on commands or control signals from the main controller. Thus, the valve controller includes a capability to execute various functions and is able to recognize and act on control signals. One such valve controller is described in US2014305525.

Typically, the valve controllers are mechanically, pneumatically and/or electrically connected to the valves to enable the control. There are valve controllers that can be used on several variants or types of valves. When installing the valve controller on a specific valve, this typically means that the valve controller has to be adjusted to and paired with the specific valve. A valve controller typically includes equipment for facilitating the control of a valve. For example, such equipment can include pilot valves and sensors. A failed control of the equipment can have a severe impact on an ongoing process in which the valve forms part of process control. For example, a malfunctioning sensor may result in a cleaning liquid being mixed with a food product. The malfunction may be a result of damaged wiring, electronics, and connectors, but also the equipment as such may stop working properly.

SUMMARY

It is an object of the invention to at least partly overcome one or more of the above-identified limitations of the prior art. In particular, it is an object to detect a malfunction of a valve controller in an efficient and timely manner.

To solve these objects, a valve controller for controlling a valve that comprises an actuator and a flow controlling unit is provided. The flow controlling unit comprises a first valve seat and a cooperating first disc that is mechanically coupled to the actuator. The valve controller comprises: equipment for controlling the function of at least one of the actuator and the flow controlling unit. The valve controller is configured to: obtaining one or more first parameter values indicative of a functionality of the equipment. The valve controller is further configured to: monitoring the equipment during operation of the valve controller for determining one or more second parameter values indicative of the functionality of the equipment and determining if a change in functionality of the equipment has occurred based on a comparison of the one or more second parameter values with the one or more first parameter values.

In particular, there is provided a valve controller for controlling a valve. The valve controller comprises equipment for controlling the function of at least one of an actuator and a flow controlling unit of the valve. The actuator is mechanically coupled to a first disc cooperating with a first valve seat to form part of the flow controlling unit. The equipment comprises an electrical input for supplying the equipment with power. The valve controller is configured to obtaining one or more first parameter values indicative of a functionality of the equipment by measuring a primary electrical quantity at the electrical input with the equipment powered off. The one or more first parameter values comprise the measured primary electrical quantity. The valve controller is also configured to monitoring the equipment during operation of the valve controller for determining one or more second parameter values indicative of the functionality of the equipment by measuring a secondary electrical quantity at the electrical input subsequent to powering off the equipment. The one or more second parameter values comprise the measured secondary electrical quantity. The valve controller is further configured to determining if a change in functionality of the equipment has occurred based on a comparison of the one or more second parameter values with the one or more first parameter values.

The first and second parameter values indicate the functionality of the equipment. The first parameter values may be obtained at startup, while the second parameters may be determined during operation. With the presumption that the equipment is functioning properly at startup, these features contribute synergetically to detecting malfunctions in the equipment of the valve controller.

Here, functionality is understood as the quality of being functional. For example, it encompasses a full function, a partial function or a partial malfunction, or a complete malfunction.

The flow controlling unit comprises the first disc and the first valve seat, since the first disc cooperates with the first valve seat to form part of the flow controlling unit of the valve.

The monitoring of the equipment may comprise the step: determining one or more second parameter values and comparing the one or more second parameter values with the one or more first parameter values. If the one or more second parameter values are within a predetermined interval of the one or more first parameter values, the determining and comparing is repeated with a time delay. Otherwise, if the one or more second parameter values are not the same, it is determined that a change in functionality of the equipment has occurred. The specified comparing can be performed quickly, which allows for a repeating in the monitoring at a high rate, or close in time to a planned energizing or de-energizing of the actuator. This contributes to an efficient and timely detection of malfunctioning equipment. Further, some equipment may require that they are turned off for determining the one or more second parameter values. Thus, with a quickly performed comparison with the one or more first parameter values, the equipment can be swiftly turned on again.

The step of obtaining one or more first parameter values indicative of a functionality of the equipment may comprise: determining the one or more first parameter values indicative of the functionality of the equipment during an initialization process of the valve controller. An initialization process is here understood to encompass a first startup process performed at the installation of the valve controller, as well as a later powering up of the valve controller. The step of obtaining one or more first parameter values indicative of a functionality of the equipment may comprise: storing the one or more first parameter values in a memory unit of the valve controller. Further, the step of monitoring the equipment may comprise: retrieving the one or more first parameter values from the memory unit. Alternatively, the one or more first parameter values may be predetermined and stored in a memory unit, and the step of obtaining one or more first parameter values indicative of a functionality of the equipment may comprise: retrieving the one or more first parameter values from the memory unit.

Each of the equipment may comprise an electrical input for supplying the equipment with power. The equipment may be one or more equipments.

The obtaining of parameter values may be performed for each equipment. Also, the monitoring of the equipment may be performed for each of the equipment.

Powering off of the equipment enables measurement of an electrical quantity without disturbance from the power supplied to the equipment. The electrical quantity of the equipment gives a characteristic of the equipment when powered off. This characteristic can be used to indicate the functionality of the equipment. The measured electrical quantity may be significantly weaker than a corresponding electrical quantity created when the equipment is powered. By powering off the equipment the electrical quantity can be measured and distinguished.

The primary electrical quantity may be a primary voltage. The secondary electrical quantity may be a secondary voltage.

The measuring of the electrical quantity may be temporary. In particular may the measuring of the secondary electrical quantity be temporary. Also the measuring of the primary electrical quantity may be temporary. The secondary electrical quantity is typically measured during operation of the valve and the process in which the valve is installed. The primary electrical quantity may be measured during an initialization process and then it is not decisive that the measuring is brief, since the valve is normally not in normal operation and the process in which the valve is installed is not running. By having a temporary measuring, the electrical quantity can be measured and the functionality of the equipment assessed without influencing the operation of the valve and a process in which the valve is installed.

The measuring of the electrical quantity may be brief, i.e. of short duration. By having a measuring of a short duration, the operation of the valve and a process in which the valve is involved is not disturbed. The measuring may have a duration of a fraction of a second, typically a few milliseconds. The measuring may for example have a duration of up to 100 milliseconds, such as up to 50 milliseconds, such as up to 25 milliseconds. The measuring may have a duration of 1-100 milliseconds, such as 1-50 milliseconds, such as 1-25 milliseconds, such as 5-25 milliseconds. The duration of the measuring may be sufficiently short to not influence the operation of the valve. The duration of the measuring may be sufficiently short to not influence the pilot valve and/or the position sensor.

The measuring of the electrical quantity may comprise generating a current in the equipment. The generating of a current may be temporary. This also means that the current may be temporary. In particular may the generating of a current when measuring the secondary electrical quantity be temporary. The secondary electrical quantity is typically measured during operation of the valve and the process in which the valve is installed. The primary electrical quantity may be measured during an initialization process and then it is not decisive that the generating of a current is brief, since the valve is normally not in normal operation and the process in which the valve is installed is not running. By having a temporary generating of a current, the electrical quantity can be measured and the functionality of the equipment assessed without influencing the operation of the valve and a process in which the valve is installed. For example, a temporary current avoids activation of the valve, e.g. by avoiding activation of a pilot valve.

The generating of a current may be brief, i.e. of short duration. By having a generating of current of a short duration, the operation of the valve and a process in which the valve is involved is not disturbed. The generating of a current may have a duration of a fraction of a second, typically a few milliseconds. The generating may for example have a duration of up to 100 milliseconds, such as up to 50 milliseconds, such as up to 25 milliseconds. The measuring may have a duration of 1-100 milliseconds, such as 1-50 milliseconds, such as 1-25 milliseconds, such as 5-25 milliseconds. The duration of the generating of a current may be sufficiently short to not influence the operation of the valve. The duration of the generating of a current may be sufficiently short to not influence the pilot valve and/or the position sensor. The duration of the generation of a current may be the same as the duration of the measuring of the electrical quantity or shorter. The generation of a current may coincide with the measuring of the electrical quantity or be comprised in the measuring, i.e. the generation of a current may occur during the duration of the measuring.

The equipment may comprise one or more pilot valves that are arranged within a housing of the valve controller. In case of one or more pilot valves, the electrical input of the one or more pilot valves may be a first electrical input. Each of the one or more pilot valves may comprise: a first electrical input for supplying the pilot valve with power. In case of one or more pilot valves, the primary electrical quantity may be a first voltage and the secondary electrical quantity may be a second voltage. The measuring of the primary electrical quantity may be performed with the pilot valve deactivated and the measuring of the secondary electrical quantity may be performed subsequent to a deactivation of the pilot valve. The obtaining of parameter values may be performed for each of the one or more pilot valves. Also, the monitoring of the equipment may be performed for each of the one or more pilot valves. By deactivating the pilot valves, the pilot valves are powered off.

Thus, for each of the one or more pilot valves, obtaining the one or more first parameter values indicative of the functionality of the equipment may comprise: measuring a first voltage at the first electrical input with the pilot valve deactivated, wherein the one or more first parameter values comprises the measured first voltage.

Further, for each of the one or more pilot valves, monitoring the equipment may comprise: measuring a second voltage at the first electrical input subsequent to a deactivation of the pilot valve. Further, the one or more second parameter values may comprise the measured second voltage. The measuring of the second voltage at the first electrical input may be performed subsequent to each deactivation of the pilot valve. This way, if a malfunction occur when changing state of the pilot valve, for example from activated to de-activated, it is detected before the next activation of the pilot valve, which contributes to reduce the effect on an ongoing process involving the valve controller.

In case of one or more pilot valves, the powering off of the pilot valve may be performed when the pilot valve is in an active state, such that the electrical quantity can be measured and the functionality of the equipment can be assessed when the valve is in operation and the pilot valve is in an active state. This may be achieved by temporarily powering off the equipment.

The one or more pilot valves may comprise a first pilot valve for energizing the actuator by allowing a first pressurized fluid to enter the actuator and for de-energizing the actuator by allowing the first pressurized fluid to leave the actuator, thereby controlling the position of the first disc.

Additionally, the one or more pilot valves may comprise: a second pilot valve for energizing the actuator by allowing a second pressurized fluid to enter the actuator and for de-energizing the actuator by allowing the second pressurized fluid to leave the actuator, thereby controlling the position of the first disc. The first pilot valve and the second pilot valve may be configured to move the first disc in the same or opposite directions when the actuator is individually energized by the first pilot valve and the second pilot valve. In other words, the first pilot valve is configured to move the first disc in one direction and the second pilot valve is configured to move the first disc in an opposite direction, i.e. in another direction that is opposite to the direction in which the first pilot valve moves the first disc. The actuator may be configured to move the first disc in opposite directions when the actuator is individually energized by the first pilot valve and the second pilot valve. Together, the first pilot valve, the second pilot valve, and the actuator may be configured to move the first disc in opposite directions when the actuator is individually energized by the first pilot valve and the second pilot valve.

The flow controlling unit may be a double seat valve and further may comprise a second valve seat and a cooperating second disc that is mechanically coupled to the actuator. Further, the one or more pilot valves may comprise: a third pilot valve for energizing the actuator by allowing a third pressurized fluid to enter the actuator and for de-energizing the actuator by allowing the third pressurized fluid to leave the actuator, thereby controlling the position of the second disc.

Each of the first, second, and third pilot valves may be a solenoid valve.

The equipment may comprise one or more position sensors. The position sensors may be location sensor for indication an actual position and/or a proximity sensors for indicating an approximate position or presence. In case of one or more position sensors, the electrical input of the one or more position sensors may be a second electrical input. Each of the one or more position sensors may comprise: a second electrical input for supplying the sensor with power. In case of one or more position sensors, the primary electrical quantity may be a third voltage and the secondary electrical quantity may be a fourth voltage. The measuring of the primary electrical quantity may be performed with the position sensor turned off and the measuring of the secondary electrical quantity may be performed subsequent to turning off the position sensor. In other words, the position sensor may be turned off before measuring the secondary electrical quantity. The obtaining of parameter values may be performed for each of the one or more position sensors. Also, the monitoring of the equipment may be performed for each of the one or more position sensors. By turning off the position sensors, the position sensors are powered off.

Thus, for each of the one or more position sensors, obtaining one or more first parameter values indicative of the functionality of the equipment may comprise: measuring a third voltage at the second electrical input with the sensor turned off. Additionally, the one or more second parameter values may comprise the measured third voltage.

Further, for each of the one or more position sensors, monitoring the equipment may comprise: turning off the sensor, measuring a fourth voltage at the second electrical input of the sensor, wherein the one or more second parameter values comprises the measured fourth voltage. Optionally, the sensor is turned on again. This ensures that the one or more first parameter values and the one or more second parameter values are obtained under the same conditions, which contributes to improving the reliability and accuracy of the monitoring.

The one or more position sensors may comprise: a first sensor for providing a first sensor reading indicating the position of the first disc. The first sensor may be a position or magneto-resistive sensor. Additionally or alternatively, the one or more position sensors may comprise: a second sensor for providing a second sensor reading indicating an open or closed state of the second valve seat and the cooperating second disc. The second sensor may be a proximity or inductive sensor.

The powering off may be temporary, i.e. the powering off of the equipment when measuring the electrical quantity may be temporary. Thus, the equipment is powered on after measuring the electrical quantity. In particular may the powering off of the equipment be temporary when measuring the secondary electrical quantity. The secondary electrical quantity is typically measured during operation of the valve and the process in which the valve is installed. The primary electrical quantity may be measured during an initialization process and then it is not decisive that the measuring is brief, since the valve is normally not in normal operation and the process in which the valve is installed is not running. By having a temporary powering off, the electrical quantity can be measured and the functionality of the equipment assessed without influencing the operation of the valve and a process in which the valve is installed. In particular, may the powering off of the one or more position sensors be temporary. By having a temporary powering off of the position sensors, the position sensors are capable of detecting malfunctions and improper operation such as oscillating disturbances such as pipe clatter and water hammering.

The powering off of the equipment may be brief, i.e. of short duration. By having a powering off of a short duration, the operation of the valve and a process in which the valve is involved is not disturbed. The powering off may have a duration of a fraction of a second, typically a few milliseconds. The powering off may for example have a duration of up to 100 milliseconds, such as up to 50 milliseconds, such as up to 25 milliseconds. The powering off may have a duration of 1-100 milliseconds, such as 1-50 milliseconds, such as 1-25 milliseconds, such as 5-25 milliseconds. The duration of the powering off may be sufficiently short to not influence the operation of the valve.

The equipment may be powered on after a short duration. The equipment may be powered on once the electrical quantity has been measured.

In case of one or more position sensors, the powering off of the position sensor may be performed when the position sensor is on during operation, such that the electrical quantity can be measured and the functionality of the equipment can be assessed when the valve is in operation and the position sensor is on. This may be achieved by temporarily powering off the equipment.

If it is determined that a change in functionality of the equipment has occurred, the monitoring further comprises: indicating the change in functionality of the equipment to at least one of an operator and a process control system configured to control the valve controller. This way, the operator or process control system can take measures to avoid an ongoing process from being affected or ruined by malfunctioning equipment, thus contributing to reduce the effect of the malfunction.

According to another aspect, there is provided a valve comprising an actuator, a flow controlling unit and a valve controller as described in the beginning of the summary. The flow controlling unit comprises a first valve seat and a cooperating first disc that is mechanically coupled to the actuator. The valve may comprise all the features and advantages described above in connection with the valve controller and in the rest of the application.

In particular, the valve comprises a valve controller for controlling the valve. The valve controller comprises equipment for controlling the function of at least one of an actuator and a flow controlling unit of the valve. The actuator is mechanically coupled to a first disc cooperating with a first valve seat to form part of the flow controlling unit. The equipment comprises an electrical input for supplying the equipment with power. The valve controller is configured to obtaining one or more first parameter values indicative of a functionality of the equipment by measuring a primary electrical quantity at the electrical input with the equipment powered off. The one or more first parameter values comprises the measured primary electrical quantity. The valve controller is also configured to monitoring the equipment during operation of the valve controller for determining one or more second parameter values indicative of the functionality of the equipment by measuring a secondary electrical quantity at the electrical input subsequent to powering off the equipment. The one or more second parameter values comprises the measured secondary electrical quantity. The valve controller is further configured to determining if a change in functionality of the equipment has occurred based on a comparison of the one or more second parameter values with the one or more first parameter values.

In other words, the valve comprises a valve controller for controlling the valve. The flow controlling unit comprises a first valve seat and a cooperating first disc that is mechanically coupled to the actuator. The valve controller comprises equipment for controlling the function of at least one of the actuator and the flow controlling unit. The equipment comprises an electrical input for supplying the equipment with power. The valve controller is configured to obtaining one or more first parameter values indicative of a functionality of the equipment by measuring a primary electrical quantity at the electrical input with the equipment powered off. The one or more first parameter values comprises the measured primary electrical quantity. The valve controller is also configured to monitoring the equipment during operation of the valve controller for determining one or more second parameter values indicative of the functionality of the equipment by measuring a secondary electrical quantity at the electrical input subsequent to powering off the equipment. The one or more second parameter values comprises the measured secondary electrical quantity. The valve controller is further configured to determining if a change in functionality of the equipment has occurred based on a comparison of the one or more second parameter values with the one or more first parameter values.

According to a further aspect a method is provided for controlling a valve. The method may comprise all the features and advantages described above in connection with the valve and the valve controller and in the rest of the application.

In particular, the method is a method for controlling a valve comprising a valve controller. The valve controller comprises equipment for controlling the function of at least one of an actuator and a flow controlling unit of the valve. The actuator is mechanically coupled to a first disc cooperating with a first valve seat to form part of the flow controlling unit. The equipment comprises an electrical input for supplying the equipment with power. The method is performed by the valve controller and comprises obtaining one or more first parameter values indicative of a functionality of the equipment by measuring a primary electrical quantity at the electrical input with the equipment powered off. The one or more first parameter values comprises the measured primary electrical quantity. The method also comprises monitoring the equipment during operation of the valve controller for determining one or more second parameter values indicative of the functionality of the equipment by measuring a secondary electrical quantity at the electrical input subsequent to powering off the equipment. The one or more second parameter values comprises the measured secondary electrical quantity. The method further comprises determining if a change in functionality of the equipment has occurred based on a comparison of the one or more second parameter values with the one or more first parameter values.

In other words, the method is a method for controlling a valve that comprises an actuator and a flow controlling unit. The flow controlling unit comprises a first valve seat and a cooperating first disc that is mechanically coupled to the actuator, and a valve controller comprising equipment for controlling the function of at least one of the actuator and the flow controlling unit. The equipment comprises an electrical input for supplying the equipment with power. The method is performed by the valve controller and comprises obtaining one or more first parameter values indicative of a functionality of the equipment by measuring a primary electrical quantity at the electrical input with the equipment powered off. The one or more first parameter values comprises the measured primary electrical quantity. The method also comprises monitoring the equipment during operation of the valve controller for determining one or more second parameter values indicative of the functionality of the equipment by measuring a secondary electrical quantity at the electrical input subsequent to powering off the equipment, wherein the one or more second parameter values comprises the measured secondary electrical quantity. The method further comprises determining if a change in functionality of the equipment has occurred based on a comparison of the one or more second parameter values with the one or more first parameter values.

The method and the elements for which the method is applied, such as the valve controller, the actuator and the flow controlling unit, may include the same features as described above in connection with the valve controller.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which FIG. 5 is a flow-chart illustrating additional features of the process described in relation to FIG. 3, FIG. 6 a is flow-chart illustrating additional features of the process described in relation to FIG. 3, FIG. 7 is a flow-charting illustrating additional details of the process described in relation to FIG. 3.

DETAILED DESCRIPTION

Figure 1:
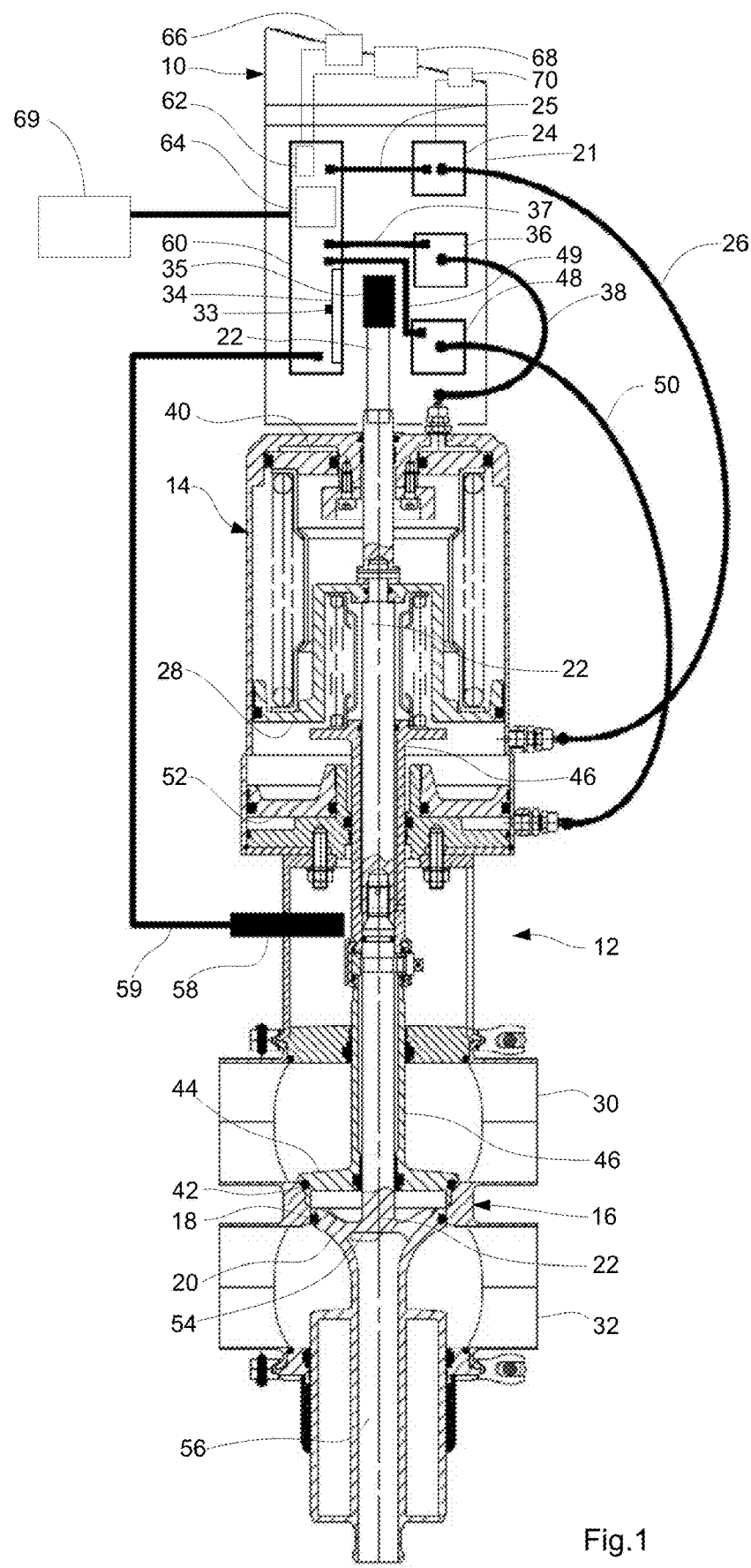
FIG. 1 is a cross-sectional view of an embodiment of a valve controller operatively connected to an actuator and a flow controlling unit of a valve.
Figure 2:
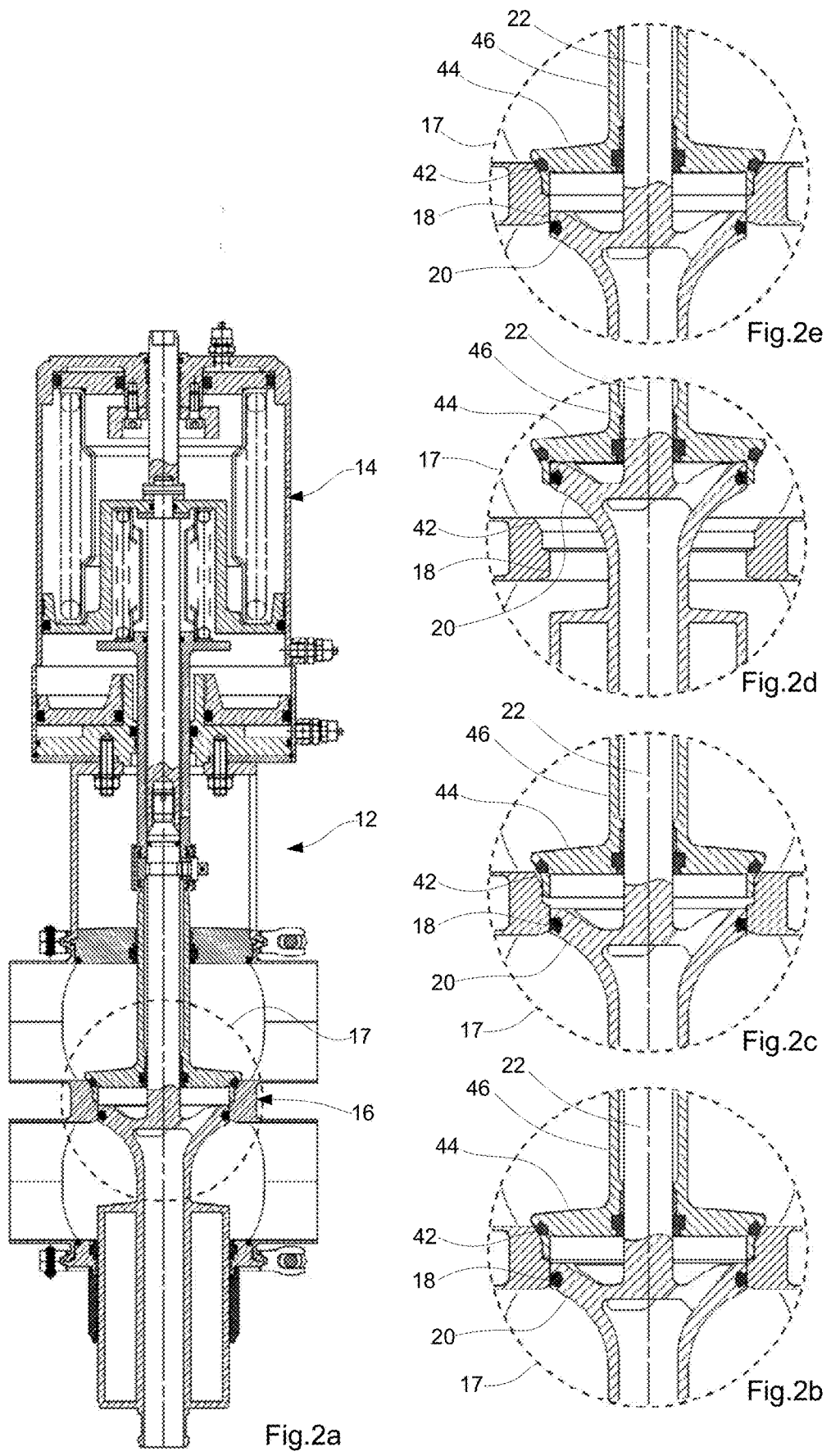
FIG. 2a is a cross-sectional view of the actuator and a flow controlling unit of FIG. 1, FIGS. 2b-e are partial views of the flow controlling unit of FIG. 2a, illustrating its different functions.

FIG. 1 is a cross-sectional view of an embodiment of a valve controller 10 that is connected to an actuator 14 and a flow controlling unit 16. Together the valve controller 10, actuator 14 and flow controlling unit 16 form a valve 12. FIG. 2a illustrates the actuator 14 and the flow controlling unit 16, and FIGS. 2b-e illustrates the portion of the flow controlling unit 16 indicated by the dashed circle 17. For example, the valve 12 may be an Alfa Laval "Unique Mix proof Valve". Other types of valves, actuators, and flow controlling units may also be employed.

The flow controlling unit 16 has a first valve seat 18 and a cooperating first disc 20 that is mechanically coupled to the actuator 14 via a first valve stem 22. The valve controller 10 has a first pilot valve 24 located in a housing 21 and the first pilot valve 24 is coupled to the actuator 14 by a first pressure conduit 26. The first pilot valve 24 controls a flow of a first pressurized fluid in the form of pressurized air and allows the pressurized first fluid to enter and energize the actuator 14 via the first pressure conduit 26. The first pilot valve 24 also allows the first pressurized fluid to de-energizing the actuator by allowing the first pressurized fluid to leave the actuator 14 via the first pressure conduit 26.

In the actuator 14, the first pressurized fluid acts on a first actuator disc 28 that is mechanically coupled to the first disc 20 by the first valve stem 22. Thus, when energized by the first pressurized fluid, the actuator 14 lifts the first disc 20 and the flow controlling unit 16 is opened to allow a flow through the first valve seat 18. For example, the flow controlling unit 16 may connect a first pipe section 30 and a second pipe section 32, and when opened a by the action of the first pilot valve 24, a flow is allowed between the pipe sections 30 and 32. In this case a second disc 44 is also lifted, as will be described below, and represents an open state of the valve 12, as shown in FIG. 2d.

The first actuator disc 28 is spring biased so that the flow controlling unit 16 is closed when the actuator 14 is de-energized by the first pilot valve 24. The position of the first disc 20 relative to the first valve seat 18 is shown in FIG. 2b. This represents a closed state of the valve, as shown in FIG. 2b.

The flow controlling unit 16 is a double seat valve. In addition to the first valve seat 18 and the first disc 20, the flow controlling unit 16 has a second valve seat 42 and a cooperating second disc 44 that is mechanically coupled to the actuator 14 via a second valve stem 46. The second valve stem 46 is hollow and the first valve stem 22 is centered on and passes through the second valve stem 46. Thus, the first disc 20 can be positioned further away from the actuator 14 than the second disc 44.

The first valve seat 18 and the cooperating first disc 20 are configured to form a radial seal, and the second valve seat 42 and the cooperating second disc 44 are configured to form an axial seal.

When the actuator 14 is energized by the first pilot valve 24, the first disc 20 is retracted (lifted) and engages the second disc 44 so that the first disc 20 lifts the second disc 44 from the second valve seat 42, as is shown in FIG. 2d. Thus, the flow controlling unit 10 is configured to change the position of the second disc 44 when the actuator 14 is energized by the first pilot valve 24.

The valve controller 10 has a first sensor 34 located in the housing 21 of the valve controller 10 and which can provide a sensor reading that indicates the position of the first disc 20. The first sensor 34 is constituted by a magneto-resistive sensor 34 with a magnet 35 that is positioned on a portion of first valve stem 22 that extends from the actuator 14 into the housing 21 of the valve controller 10. Since the magnet is located on the stem, an indication of the position of the magnet is directly related to the position of the first disc 20.

The valve controller 10 also has a second pilot valve 36 located in the housing 21 and the second pilot valve 36 is coupled to the actuator 14 by a second pressure conduit 38. The second pilot valve 36 controls a flow of a second pressurized fluid in the form of pressurized air and allows the pressurized first fluid to enter and energize the actuator 14 via the second pressure conduit 38. The second pilot valve 36 also allows the second pressurized fluid to de-energize the actuator 14 by allowing the second pressurized fluid to leave the actuator 14 via the second pressure conduit 38.

In the actuator 14, the second pressurized fluid acts on a second actuator disc 40 that is mechanically coupled to the first disc 20 by the first valve stem 22. When energized by the second pressurized fluid, the actuator 14 pushes the first disc 20 and the flow controlling unit 14 is opened to allow a flow past the first valve seat 18. The first disc 20 has an aperture 54 through which the flow can continue and leave the flow controlling unit 16 via an open-ended outlet pipe 56 attached to the first disc 20. This represents a seat push state of the valve, see FIG. 2e, which is used when the first valve seat shall be cleaned by a cleaning liquid.

The first disc 20 is thus controlled by the first pilot valve 24 and the second pilot valve 36, and the actuator 14 is thereby configured to move the first disc 20 in opposite directions by lifting or pushing when the actuator 14 is individually energized by the first pilot valve 24 or the second pilot valve 36, respectively. The second actuator disc 40 is spring biased so that the flow controlling unit 16 is closed when the actuator 14 is de-energized by the second pilot valve 36, as is shown in FIG. 2b.

The valve controller 10 also has a third pilot valve 48 located in the housing 21 and the third pilot valve 48 is coupled to the actuator 14 by a third pressure conduit 50. The third pilot valve 48 controls a flow of a third pressurized fluid in the form of pressurized air and allows the pressurized third fluid to enter and energize the actuator 14 via the third pressure conduit 50. The third pilot valve 48 also allows the third pressurized fluid to de-energize the actuator 14 by allowing the third pressurized fluid to leave the actuator 14 via the third pressure conduit 50. Thus, a position of the second disc 44 is controlled by the third pilot valve 48.

The third pressurized fluid acts on a third actuator disc 52 in the actuator 14. The third actuator disc 52 is mechanically coupled to the second disc 44 by the second valve stem 46. Thus, when energized by the third pressurized fluid, the actuator 14 lifts the second disc 44 and the flow controlling unit 16 is opened to allow a flow past the second valve seat 42. The flow can continue through the aperture 54 and leave the flow controlling unit 16 via an open-ended outlet pipe 56 attached to the first disc 20. This represents a seat lift state of the valve, see FIG. 2c, which is used when the second valve seat shall be cleaned by a cleaning liquid.

The valve controller 10 has a second sensor 58 that is located between the actuator 14 and the flow controlling unit 16 and provides a sensor reading that indicates a position, and more specifically an open or closed state, of the second valve stem 46 and hence the second disc 44. The second sensor 58 may be a proximity or inductive sensor that measures on the second valve stem 46.

The valve controller 10 has a control unit 60 with a processor unit 62 and a memory unit 64. The control unit 60 is operatively connected to the first pilot valve 24, the second pilot valve 36, the third pilot valve 48, the first sensor 34, and the second sensor 58 by electrical communication cables to facilitate control of and communication with these parts. The memory unit 64 can store a number of setup parameter values and computer program instructions that, when executed by the processor unit 62, causes the valve controller 10 to perform a number of process steps as described below, thus configuring the valve controller 10 to execute a process.

Each of the pilot valves 24, 36, 48 has a respective electrical input 25, 37, 49 in the form of electrical connections that are coupled to the control unit 60 and by which the pilot valves 24, 36, 48 are supplied with power. Similarly, the first sensor 34 is connected to the control unit 60 via an electrical input 33. The second sensor 58 is connected to the control unit 60 via an electrical input wire 59.

The valve controller 10 is fitted with an input device 66 that is connected to the control unit 60 and by which by the setup process can be initiated. In the present embodiment, the input device 66 is configured to initiate the setup process upon a single command by an operator and has a manually operated switch by which the single command can be provided.

The valve controller 10 is also fitted with an indicator 68 in the form of LED-lights that can visually indicate an error condition of the valve controller 10 to an operator, and a manual override 70 in the form of a manual switch for manually controlling the first pilot valve 24.

Figure 3:
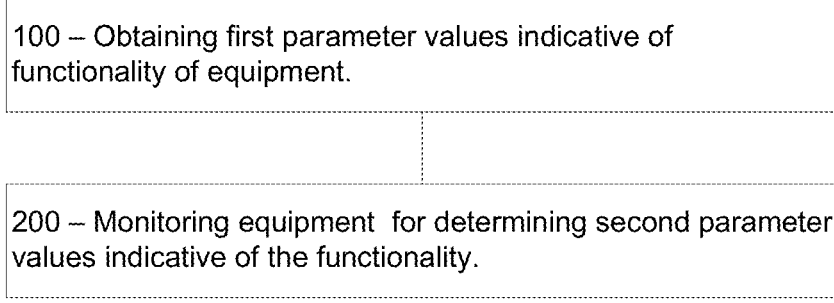
FIG. 3 is a flow-chart illustrating an embodiment of process performed by the valve controller described in relation to FIG. 1.

FIG. 3 is a flow-chart illustrating an embodiment of a process implemented in the valve controller 10 described above. The process includes the step of obtaining 100 one or more first parameter values indicative of a functionality of the equipment 24, 34, 36, 48, 58 at startup of the valve controller 10. The process further includes the step of monitoring 200 the equipment 24, 34, 36, 48, 58 during operation of the valve controller for determining one or more second parameter values indicative of the functionality of the equipment 24, 34, 36, 48, 58. The monitoring also includes determining 210 (see FIG. 4) if a change in functionality of the equipment 24, 34, 36, 48, 58 has occurred based on a comparison of the one or more second parameter values with the one or more first parameter values.

Figure 4:
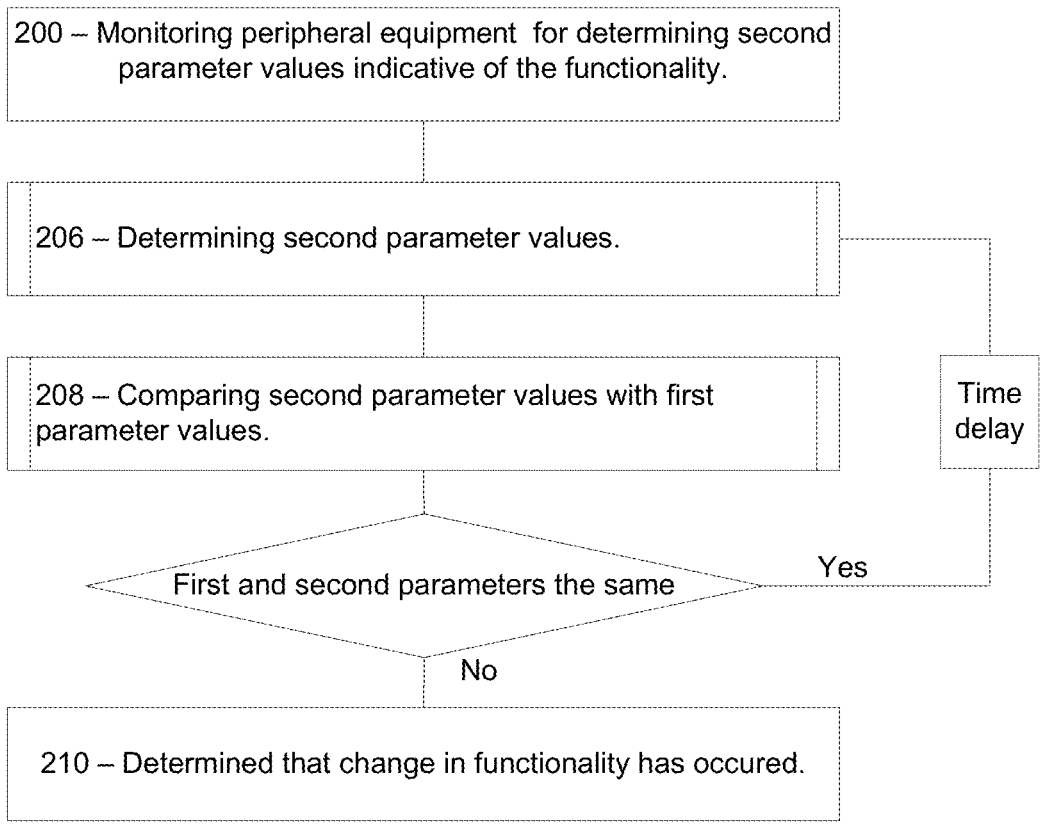
FIG. 4 is a flow-chart illustrating additional features of the process described in relation to FIG. 3.

As illustrated in FIG. 4, the monitoring 200 of the equipment 24, 34, 36, 48, 58 includes the step of determining 206 one or more second parameter values and comparing 208 the one or more second parameter values with the one or more first parameter values. If the one or more second parameter values are within a predetermined interval of the one or more first parameter values, the determining 200 and comparing 208 is repeated with a time delay, otherwise, it is determined that a change in functionality of the equipment 24, 34, 36, 48, 58 has occurred. In one embodiment, the time delay is 10 s. For example, if the one or more first and second parameters represents a voltage, the predetermined interval may correspond to ±0.5V.

The process is further described in FIG. 5. The step of obtaining 100 one or more first parameter values indicative of a functionality of the equipment 24, 34, 36, 48, 58 includes a number of sub-steps. In one sub-step, the one or more first parameter values indicative of the functionality of the equipment 24, 34, 36, 48, 58 are determined 102. In a subsequent sub-step, the one or more first parameter values are stored 104 in a memory unit 64. The step of monitoring 200 the equipment 24, 34, 36, 48, 58 also includes a sub-step, namely to retrieving 202 the one or more first parameter values from the memory unit 64, which facilitates the comparison between the one or more first parameter values and the one or more second parameter values.

In an alternative embodiment, the one or more first parameter values are predetermined and stored in a memory unit. The step of obtaining 100 one or more first parameter values indicative of a functionality of the equipment then comprises: retrieving the one or more first parameter values from the memory unit.

Further features of the process are described in FIG. 6. If it is determined 210 that a change in functionality of the equipment 24, 34, 36, 48, 58 has occurred, the monitoring 200 further comprises the sub-step of indicating 212 the change in functionality of the equipment 24, 34, 36, 48, 58 to an operator via the indicator 68. In an alternative embodiment, the change in functionality is indicated 212 to a process control system 69 coupled to and configured to control the valve controller 10.

FIG. 7 is a flow-chart revealing additional or alternative details of the process described in relation to FIG. 3. for each of the pilot valves 24, 36, 48, the step of obtaining 100 one or more first parameter values includes a sub-step in which a first voltage is measured 106 at the first electrical input 24, 36, 48 with the pilot valve 24, 36, 48 deactivated. Here, the measured first voltage forms part of the one or more first parameter values. Similarly, for each of the sensors 34, 58, the step of obtaining 100 one or more first parameter values includes a sub-step in which a third voltage is measured 108 at the second electrical input with the sensor 34, 58 turned off, and the measured third voltage forms part of the one or more second parameter values.

The subsequent step of monitoring 200 the equipment 24, 34, 36, 48, 58 includes, for each pilot valves 24, 36, 48, the sub-step of measuring 214 a second voltage at the first electrical input 25, 37, 49 subsequent to a deactivation of the pilot valve 24, 36, 48. The measured second voltage then forms part of the one or more second parameter values and is compared with the first voltage that has been measured for the same pilot valve. For each sensor 34, 58, the step of monitoring 200 the equipment 24, 34, 36, 48, 58 comprises the sub-steps of turning 216 off the sensor 34, 58, measuring 218 a fourth voltage at the second electrical input 33, 59 of the sensor 34, 58, and turning on 220 the sensor 34, 58. Here, the one or more second parameter values include the measured fourth voltage, which is compared with the third voltage that has been measured for the same sensor.

In all of the above embodiments, the first, second, and third pilot valves may be a solenoid valve. The solenoid valve may be closed when inactive and open when activated. Further, they may be coupled to a central compressor system for providing the first pressurized fluid, the second pressurized fluid, and the third pressurized fluid.

Figure 8:
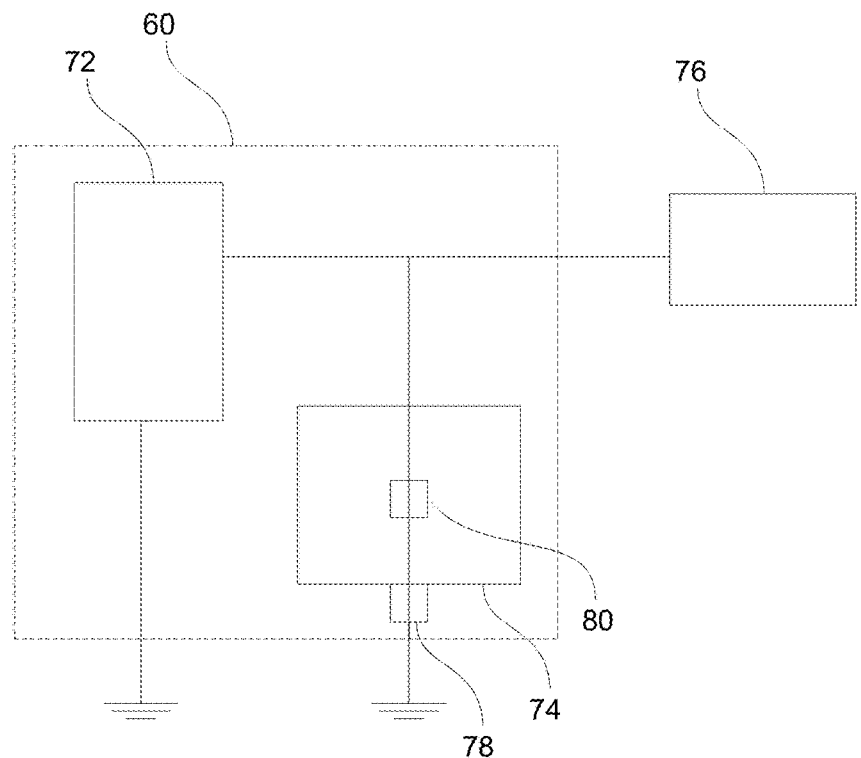
FIG. 8 illustrates a pilot valve activation unit and a pilot valve monitoring unit.

FIG. 8 illustrates a pilot valve activation unit 72 that can activate, deactivate and supply a pilot valve 76 with power and a pilot valve monitoring unit 74 for monitoring the pilot valve 76. The pilot valve 76 may be any of the previously mentioned pilot valves 24, 36, 48. Both the pilot valve activation unit 72 and the pilot valve monitoring unit 74 forms part of the control unit 60. The function of the pilot valve activation unit 72 and the pilot valve monitoring unit 74 is briefly described here.

When the pilot valve 76 is de-energized by the pilot valve activation unit 72, the pilot valve monitoring unit 74 is activated by a switch 78 for a short time. In one embodiment, the switch 78 is a MOSFET. If the pilot valve 76 if functioning, a small current runs from the pilot valve 76 through the pilot valve monitoring unit 74 and the switch 78 to ground.

A voltage is determined at a voltage divider 80 of the pilot valve monitoring unit 74. This measurement is done both at startup, yielding the voltage $U_{ref}$, and repeatedly during operation, yielding $U_{meas}$. If the measured operation voltage is approximately equal to the startup voltage (Umeas=Uref), the pilot valve 76, such as a solenoid valve, is considered intact and the functionality unchanged.

Figure 9:
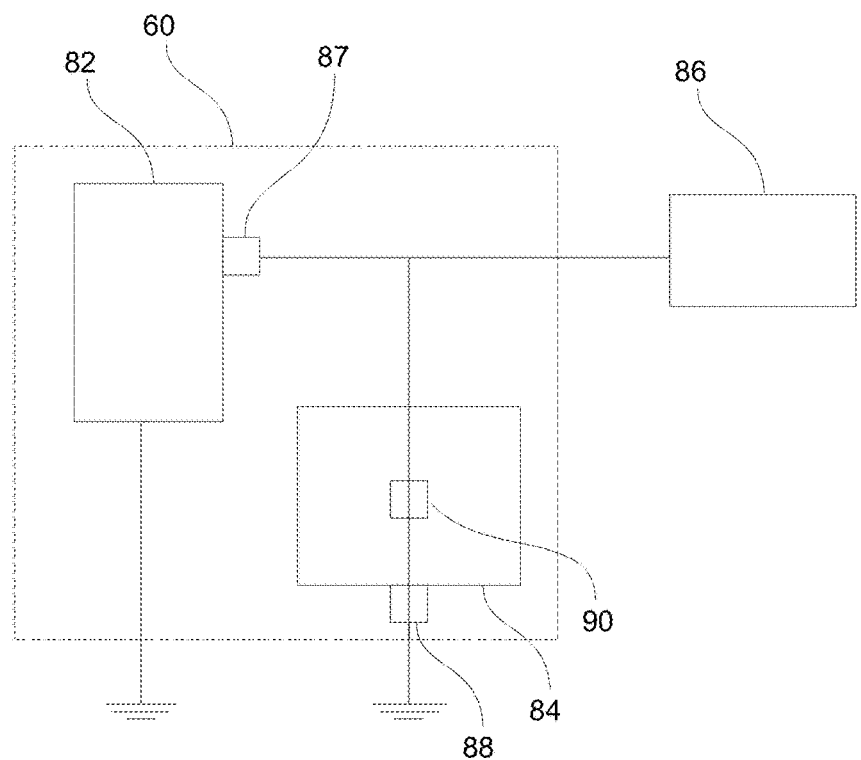
FIG. 9 illustrates a sensor operation unit and a sensor monitoring unit.

FIG. 9 illustrates a sensor operation unit 82 that is used for turning on and off a sensor 86 and supplying it with power, and a sensor monitoring unit 84 for monitoring the sensor 86. The sensor 86 may be any of the previously mentioned sensors 34, 58. The function of the sensor operation unit 82 and the sensor monitoring unit 84 is briefly described here.

In contrast to solenoid valves, a sensor 86 is always on during operation. In order to determine its functionality, it is necessary to turn off the sensor 86 for the duration of the measurement. Thus, the sensor 86 is deactivated by a switch 87 in the sensor operation unit 82. In one embodiment, this switch 87 comprises a MOSFET. Another switch 88 is then activated in the sensor monitoring unit 84 for a few milliseconds. In one embodiment, this switch 88 comprises a MOSFET. If the sensor 86 is functioning, a small current then runs from the sensor 86 through a voltage divider 90 and through the switch 88 to ground. The voltage in the midpoint of the voltage divider 90 is measured. Subsequently, the switch 88 of the sensor monitoring unit 84 is deactivated and the sensor 86 is activated by the switch 87 of the sensor operation unit 84. The measurement is done both at startup, yielding the voltage $U_{ref}$, and repeatedly during operation, yielding $U_{meas}$. If the measured operation voltage is approximately equal to the startup voltage (Umeas=Uref), the sensor 86, such as a proximity or inductive sensor, is considered intact and the functionality unchanged. The whole measurement takes about a few milliseconds, which is short enough to not influence the operation of the valve 12.

From the description above follows that, although various embodiments of the invention have been described and shown, the invention is not restricted thereto, but may also be embodied in other ways within the scope of the subject-matter defined in the following claims.

The invention claimed is:

1. A valve controller for controlling a valve, the valve controller comprising equipment for controlling the function of at least one of an actuator of the valve, which is mechanically coupled to a first disc cooperating with a first valve seat to form part of a flow controlling unit of the valve, and the flow controlling unit, the first disc cooperating with the first valve seat to block flow through the first valve seat and being movable away from the first valve seat to permit flow through the first valve seat, the equipment comprising at least one pilot valve arranged within a housing of the valve controller and an electrical input for supplying the equipment, including the at least one pilot valve, with power, the equipment also comprising at least one position sensor that senses a position of the first disc, and an electrical input for supplying the at least one position sensor with power, the valve controller being configured to:

obtain one or more first parameter values indicative of a functionality of the at least one pilot valve by measuring a voltage at the electrical input of the at least one pilot valve with the at least one pilot valve deactivated, wherein the one or more first parameter values comprises the voltage measured at the electrical input of the at least one pilot valve with the at least one pilot valve deactivated, monitor the at least one pilot valve during operation of the valve controller for determining one or more second parameter values indicative of the functionality of the at least one pilot valve by measuring a voltage at the electrical input of the at least one pilot valve after deactivation of the at least one pilot valve, wherein the one or more second parameter values comprises the voltage measured at the electrical input of the at least one pilot valve after the deactivation of the at least one pilot valve, determine if a change in functionality of the at least one pilot valve has occurred by comparing the voltage measured at the electrical input of the at least one pilot valve while the at least one pilot valve is deactivated with the voltage measured at the electrical input of the at least one pilot valve after the deactivation of the at least one pilot valve, obtain one or more first parameter values indicative of a functionality of the at least one position sensor by measuring a primary electrical quantity at the electrical input of the at least one position sensor with the at least one position sensor powered off, wherein the one or more first parameter values comprises the measured primary electrical quantity, monitor the at least one position sensor during operation of the valve controller to determine one or more second parameter values indicative of the functionality of the at least one position sensor by measuring a secondary electrical quantity at the electrical input of the at least one position sensor subsequent to powering off the at least one position sensor, wherein the one or more second parameter values comprises the measured secondary electrical quantity, and determine if a change in functionality of the at least one position sensor has occurred based on a comparison of the secondary electrical quantity of the one or more second parameter values with the primary electrical quantity of the one or more first parameter values.

2. The valve controller according to claim 1, wherein the determining of the one or more second parameter values and the comparison of the one or more second parameter values with the one or more first parameter values is repeated with a time delay, otherwise, it is determined that a change in functionality of the equipment has occurred.

3. The valve controller according to claim 1, wherein the step of obtaining one or more first parameter values indicative of a functionality of the at least one position sensor comprises:
   determining the one or more first parameter values indicative of the functionality of the at least one position sensor during an initialization process of the valve controller.

4. The valve controller according to claim 3, wherein the step of obtaining one or more first parameter values indicative of a functionality of the at least one position sensor comprises:
   storing the one or more first parameter values in a memory unit of the valve controller, and the step of monitoring the at least one position sensor comprises:
   retrieving the one or more first parameter values from the memory unit.

5. The valve controller according to claim 1, wherein the measuring of the secondary electrical quantity is temporary.

6. The valve controller according to claim 1, wherein the at least one pilot valve comprises:
   a first pilot valve for energizing the actuator by allowing a first pressurized fluid to enter the actuator and for de-energizing the actuator by allowing the first pressurized fluid to leave the actuator, thereby controlling the position of the first disc.

7. The valve controller according to claim 6, wherein the at least one pilot valve comprises:
   a second pilot valve for energizing the actuator by allowing a second pressurized fluid to enter the actuator and for de-energizing the actuator by allowing the second pressurized fluid to leave the actuator, thereby controlling the position of the first disc, wherein the first pilot valve and the second pilot valve are configured to move the first disc in same or opposite directions when the actuator is individually energized by the first pilot valve and the second pilot valve.

8. The valve controller according to claim 1, wherein the electrical input of the at least one position sensor is a second electrical input.

9. The valve controller according to claim 8, wherein the primary electrical quantity is a third voltage and the secondary electrical quantity is a fourth voltage.

10. The valve controller according to claim 1, wherein the at least one position sensor comprises:
    a first sensor for providing a first sensor reading indicating the position of the first disc; and
    a second sensor for providing a second sensor reading indicating an open or closed state of a second valve seat and a cooperating second disc of the flow controlling unit.

11. The valve controller according to claim 1, wherein the powering off of the at least one sensor is temporary.

12. A method for controlling a valve that comprises an actuator and a flow controlling unit, wherein the flow controlling unit comprises a first valve seat and a cooperating first disc that is mechanically coupled to the actuator, and a valve controller comprising equipment for controlling the function of at least one of the actuator and the flow controlling unit, the first disc cooperating with the first valve seat to block flow through the first valve seat and being movable away from the first valve seat to permit flow through the first valve seat, the equipment comprising at least one pilot valve and an electrical input for supplying the equipment, including the at least one pilot valve, with power, the equipment also comprising at least one position sensor that senses a position of the first disc, and an electrical input for supplying the at least one position sensor with power, the method being performed by the valve controller and comprising:
   obtaining one or more first parameter values indicative of a functionality of the at least one pilot valve by measuring voltage at the electrical input with the at least one pilot valve deactivated to acquire measured primary electrical quantity, wherein the one or more first parameter values comprises the voltage measured at the electrical input with the at least one pilot valve deactivated,
   monitoring the at least one pilot valve during operation of the valve controller to determine one or more second parameter values indicative of the functionality of the at least one pilot valve by measuring a voltage at the electrical input subsequent to deactivation of the at least one pilot valve, wherein the one or more second parameter values comprises the voltage measured at the electrical input subsequent to deactivation of the at least one pilot valve,
   determining if a change in functionality of the at least one pilot valve has occurred by comparing the voltage measured at the electrical input of the at least one pilot valve while the at least one pilot valve is deactivated and the voltage measured at the electrical input of the at least one pilot valve after the deactivation of the at least one pilot valve,
   obtaining one or more first parameter values indicative of a functionality of the at least one position sensor by measuring a primary electrical quantity at the electrical input of the at least one position sensor with the at least one position sensor powered off, wherein the one or more first parameter values comprises the measured primary electrical quantity,
   monitoring the at least one position sensor during operation of the valve controller for determining one or more second parameter values indicative of the functionality of the at least one position sensor by measuring a secondary electrical quantity at the electrical input of the at least one position sensor subsequent to powering off the at least one position sensor, wherein the one or more second parameter values comprises the measured secondary electrical quantity, and
   determine if a change in functionality of the at least one position sensor has occurred based on a comparison of the secondary electrical quantity of the one or more second parameter values with the primary electrical quantity of the one or more first parameter values.

13. The method according to claim 12, further comprising turning the at least one position sensor on after the measuring of the other voltage at the electrical input of the at least one position sensor.

14. A valve controller for controlling a valve, the valve controller comprising equipment for controlling the function of at least one of an actuator of the valve, which is mechanically coupled to a first disc cooperating with a first valve seat to form part of a flow controlling unit of the valve, and the flow controlling unit, the equipment comprising at least one position sensor that comprises an electrical input for supplying the at least one position sensor with power, the equipment also comprising at least one pilot valve, and an electrical input for supplying the at least one pilot valve with power, the valve controller being configured to:

obtain one or more first parameter values indicative of a functionality of the equipment, the obtaining of the one or more first parameter values indicative of the functionality of the equipment comprising:

measuring a voltage at the electrical input of the at least one position sensor while the at least one position sensor is turned off, the measured voltage being the one or more first parameter values;

monitor the equipment during operation of the valve controller for determining one or more second parameter values indicative of the functionality of the equipment, the monitoring of the equipment during operation of the valve controller for determining one or more second parameter values indicative of the functionality of the equipment comprising:

turning off the at least one position sensor and measuring an other voltage at the electrical input of the at least one position sensor subsequent to turning off the at least one position sensor, the other measured voltage being the one or more second parameter values;

determine if a change in functionality of the equipment has occurred based on a comparison of the other measured voltage with the measured voltage;

measure a voltage at the electrical input of the at least one pilot valve while the at least one pilot valve is deactivated;

measure a voltage at the electrical input of the at least one pilot valve after deactivation of the at least one pilot valve; and determine if a change in functionality of the equipment has occurred based on a comparison of the voltage measured at the electrical input of the at least one pilot valve while the at least one pilot valve is deactivated and the voltage measured at the electrical input of the at least one pilot valve after deactivation of the at least one pilot valve.

\* \* \* \* \*